United States Patent [19]

Howell

[11] Patent Number: 4,803,894
[45] Date of Patent: * Feb. 14, 1989

[54] BICYCLE PEDALLING APPARATUS

[75] Inventor: Richard J. Howell, Winooski, Vt.

[73] Assignee: The Shelburne Corporation, Shelburne, Vt.

[*] Notice: The portion of the term of this patent subsequent to Feb. 3, 2004 has been disclaimed.

[21] Appl. No.: 941,581

[22] Filed: Dec. 16, 1986

Related U.S. Application Data

[63] Continuation of Ser. No. 701,311, Feb. 19, 1985, abandoned, which is a continuation-in-part of Ser. No. 583,890, Feb. 27, 1984, Pat. No. 4,640,151.

[51] Int. Cl.$^4$ ............................................. G05G 1/14
[52] U.S. Cl. ..................................... 74/594.6; 36/131
[58] Field of Search ................... 74/594.4, 594.6, 560; 36/131, 132, 122, 62, 30 R; 280/11.3, 613; 116/277, 298, 284

[56] References Cited

U.S. PATENT DOCUMENTS

| | | | |
|---|---|---|---|
| 458,608 | 9/1891 | Wheeler | 36/131 X |
| 550,409 | 11/1895 | Hanson | 74/594.6 |
| 588,038 | 8/1897 | Tudor | 74/594.6 |
| 595,388 | 12/1897 | Hanson | 74/594.6 |
| 598,325 | 2/1898 | McIntyre | 74/594.6 |
| 1,202,451 | 10/1916 | Stern | 36/132 X |
| 2,734,477 | 2/1956 | Rose et al. | 116/277 |
| 3,389,678 | 6/1968 | Fenwick | 116/284 |
| 3,727,932 | 4/1973 | Druss et al. | 280/613 |
| 3,812,603 | 5/1974 | Goodman | 36/132 X |
| 3,869,136 | 3/1975 | Jackson | 280/613 |
| 3,918,732 | 11/1975 | Wulf | 280/613 X |
| 3,964,343 | 6/1976 | Lauterbach | 74/594.4 X |
| 4,021,056 | 5/1977 | Oakes | 280/613 |
| 4,196,920 | 4/1980 | Salomon | 280/613 |
| 4,298,210 | 3/1981 | Lotteau et al. | 280/11.3 X |
| 4,488,453 | 12/1984 | Drugeon et al. | 74/594.6 |
| 4,640,151 | 3/1987 | Howell | 74/594.6 |

FOREIGN PATENT DOCUMENTS

| | | | |
|---|---|---|---|
| 15803 | 9/1980 | European Pat. Off. | 74/594.6 |
| 57240 | 8/1982 | European Pat. Off. | 74/560 |
| 98329 | 1/1984 | European Pat. Off. | 74/560 |
| 106162 | 4/1984 | European Pat. Off. | 36/131 |
| 3149345 | 6/1983 | Fed. Rep. of Germany | . |
| 80/01056 | 5/1980 | PCT Int'l Appl. | 74/594.6 |
| 10713 | of 1885 | United Kingdom | 74/594.4 |
| 16829 | of 1908 | United Kingdom | 74/594.6 |
| 703040 | 1/1954 | United Kingdom | 74/594.6 |
| 1586136 | 3/1981 | United Kingdom | 74/594.6 |

Primary Examiner—Gary L. Smith
Assistant Examiner—Rodney M. Lindsey
Attorney, Agent, or Firm—Lahive & Cockfield

[57] ABSTRACT

Cycle pedalling apparatus is disclosed having a latch element that projects from a pedal, the latch element having latch members which are resiliently deflectable. A socket element on the sole of a rider's foot releasably and replaceably couples with the latch element for pedalling action, and releases from the latch element under non-pedalling loads.

30 Claims, 9 Drawing Sheets

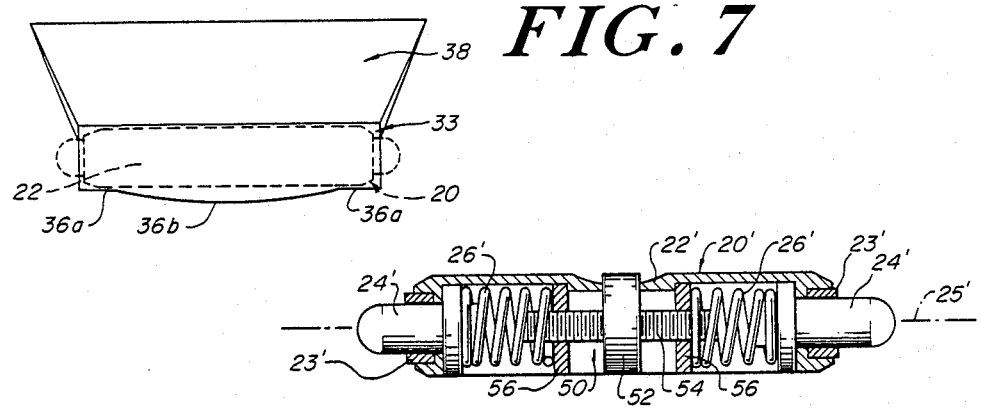
FIG. 7
FIG. 8
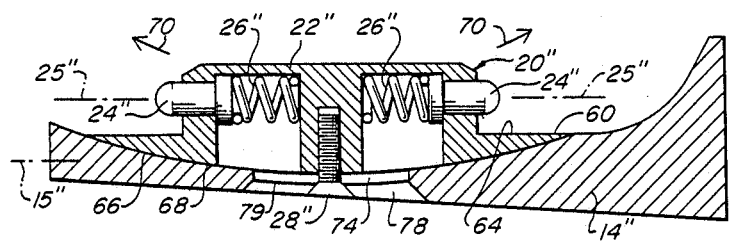
FIG. 9A
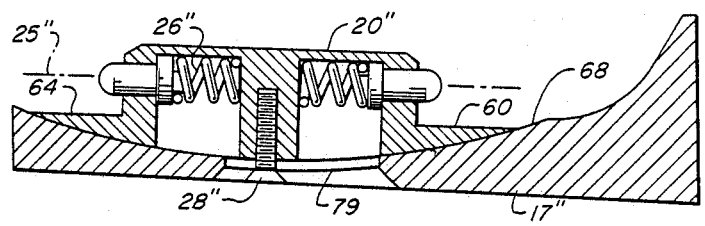
FIG. 9B
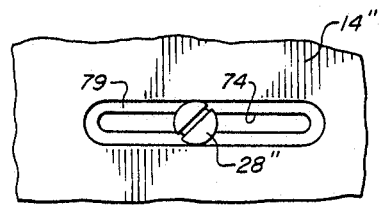
FIG. 9C

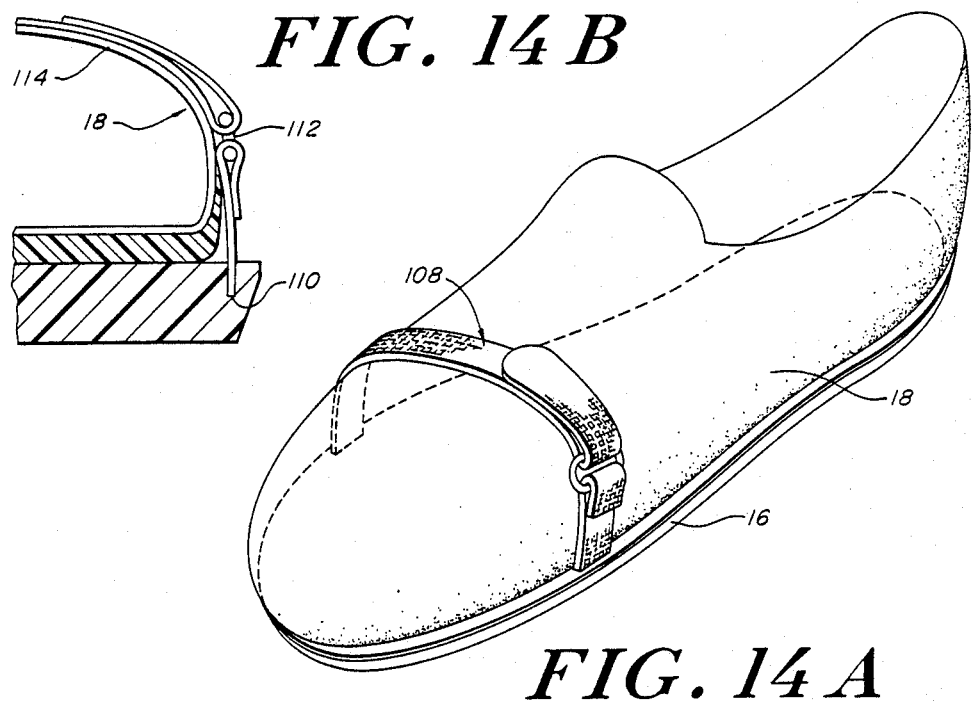
FIG. 14B
FIG. 14A
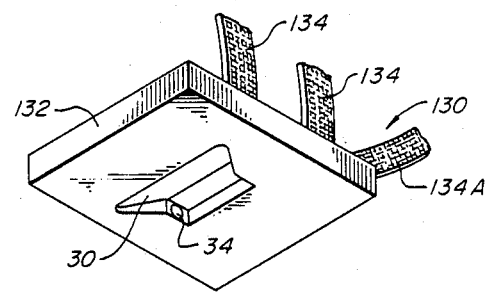
FIG. 16

BICYCLE PEDALLING APPARATUS

This application is a continuation of application Ser. No. 701,311, filed Feb. 19, 1985, now abandoned, which was a continuation-in-part of U.S. patent application Ser No. 583,890, filed Feb. 27, 1984, now U.S. Pat. No. 4,640,151.

BACKGROUND OF THE INVENTION

This invention relates to pedalling systems for bicycles, exercise cycles and like pedalled mechanisms. More particularly, the invention provides a pedalling apparatus that fastens a cyclist's shoe to a pedal securely for all pedal strokes. The pedalling system releases the shoe from the pedal readily upon an untoward, non-pedalling movement. Further, a cyclist can intentionally couple the shoe to the pedal, and release from the pedal, easily and essentially instantaneously. Both the coupling and releasing actions are accomplished without requiring the cyclist to remove a hand from the handlebar. The invention is described, for sake of clarity, with reference to bicycle pedalling equipment, and is applicable to other pedal-driven mechanisms.

The common bicycle pedal is driven only on a downstroke by the down thrust of a cyclist's foot. The addition of toe straps and like harnesses on a pedal, to engage the cyclist's shoe, enables an upward thrust also to propel the cycle. The addition of cleats allows the cyclist to provide ankling action, in which a combination of upward and rearward forces further enhances pedalling efficiency. The inconvenience and accident hazard of toe straps and cleats have lead to other devices for fastening a cyclist's shoe to a pedal, as German Patent Specification No. DE 3,149,345 illustrates. There is still need, however, for pedalling apparatus which is safe, convenient, reliable and simple.

The forces and movements of a foot which are involved in pedalling can have up to six degrees of action. A vertical downward force of a rider's foot on a pedal is perhaps the most common action. A rider using the prior toe straps in addition can apply a vertical upward force. Toe straps also transfer a longitudinal forward force to the pedal, and the prior cleat transfers a longitudinal backward force. A third possible action is a lateral or sideways force, which contributes little to pedalling. The remaining three actions are rotational movements which a rider's foot can undergo. Twist is rotation about a vertical axis and roll is rotation about a longitudinal axis. Bend is rotation about a lateral axis, which is the axis that extends parallel to the axis about which a pedal revolves. Pedalling desirably involves vertical and longitudinal forces, typically with a different magnitude for each direction, i.e. up, down, forward, and backward. The rider's foot in addition may bend during a full pedalling stroke, and may twist and/or roll slightly.

One problem with toe straps and the like is that the pedalling apparatus must often be clinched by hand; the cyclist must let go of the handlebar in order to actuate engagement. The removal of the cyclist's hands from the handlebar can sometimes contribute to accidents.

It is an object of this invention to provide a pedal-shoe fastening apparatus that engages readily, that maintains positive retention for all pedalling strokes, and that releases readily in response to non-pedalling foot movements and loads, both intentional and accidental. It is also an object of this invention to provide a pedalling apparatus that can be coupled and released without manual efforts.

Another object is to provide cycle pedalling apparatus of the above character which is convenient, reliable, and safe to use. It is a further object that the apparatus be capable of providing high performance cycling. The attainment of this objective calls on the apparatus to function with greater energy transfer, and correspondingly less energy dissipation, than occurs with a conventional toe strap and cleat.

Other objects of the invention will in part be obvious and will in part appear hereinafter.

SUMMARY OF THE INVENTION

A pedalling mechanism is disclosed which accommodates certain levels of vertical and longitudinal forces, and of bend, twist, and roll. The mechanism, however, releases the rider's foot under excessive levels of such forces and movements, other than vertically down and longitudinally forward. The release action responds to different levels of the different pedalling actions and can react to cross-coupled (e.g., twist-roll, twist-vertical) loadings as well. The mechanism withstands the vertically upward force useful in pedalling, and withstands the pedalling level of longitudinally backward force, but releases when either force or a combination force exceeds pre-programmed levels. Similarly, rotational movements in excess of those desired for pedalling or safe for the rider are to cause release. The pedalling mechanism according to the invention meets these potentially conflicting requirements for secure coupling and reliable release, at different levels for different actions. The mechanism is designed to release the cyclist when riding limits are exceeded and well below the biomechanical limits that would cause injuries. The mechanism functions equally well for novices and expects and is relatively independent of the cyclist's strength.

More particularly, the present invention resides in a pedalling apparatus for releasably and replacably coupling a rider's foot to a bicycle crank that carries at least one pedal, revolvable about a normally-horizontal pedal axis. The apparatus includes a latch element projecting from the pedal and a socket element adapted for wearing on a rider's foot. In the illustrated embodiments the latch element has a pair of aligned latch members. At least one latch member is resiliently biased relative to the other one, along a latch axis oriented longitudinal with the pedal axis. The two latch members preferably are directed approximately along the latch axis, and are both resiliently biased. Additionally, the socket element in the illustrated embodiments has a latch-receiving recess with first and second latch seats which releasably and replacably couples with the latch members. The resilient latching bias resists release of the latch element from the socket element. In use, the coupled latch and socket elements transmit a cycling thrust to the pedal in response to downstroke forces exerted by the rider, and in response to upstroke and backstroke forces, which together are termed ankling forces. Further, the apparatus provides a breakaway action, in which the latch element unseats from the socket element in response to accidental, trauma-producing forces and moments, and in response to other selected, non-pedalling rider movements.

In a preferred embodiment, the socket recess is disposed in the sole of a cycling shoe and has a seat portion which receives and couples to the latch element. The recess also has a front guiding portion extending forward of the seat portion for guiding the latch element into and out of the seat portion.

The front guiding portion has a downwardly facing and longitudinally extending ramp. The ramp provides the recess with progressive depth within the socket element as the ramp extends backwardly toward the seat portion. The socket recess also has inwardly-facing flairing sidewalls extending outward and forward along the front guiding portion for providing the recess with increasing longitudinal width forward of the seat portion. Additionally, the side walls of the seat portion can be tilted or otherwise angled in the longitudinal and vertical directions to further control the ratios of twist release torque to vertical release force and of backward shear release force to roll release torque in order to optimize overall safety and control.

The latch element has a forward thrust-receiving surface disposed along the latch axis with the latch members. The socket recess has a back wall portion rearward of the seat portion. The wall portion abuts the forward thrust-receiving surface of the latch element when the latch element is seated in the socket element.

In one preferred embodiment, the latch members are lateral spring-compressed plungers; in another, the members are resilient rods. A further optional feature is that each latch seat has an inner detent arranged to seat an outwardly biased latch member, and has an outer detent that is off-center from the inner detent. The outer detent is arranged to seat a latch member with a lesser resilient bias than an inner detent.

Other preferred features of the invention include a resiliency-adjusting mechanism for adjusting the resilient bias of the latch members, and a pivotal attachment mechanism for adjustably attaching the latch element to the pedal with a selective orientation of the latch axis relative to the pedal axis. The latch-axis orientation can be adjusted with two degrees of freedom, to match a rider's foot. Additionally, the pedal surface can be formed from a replaceable, low-friction material, typically a polymeric material, to enhance the consistency and unformity of the release operation, with minimal dependence on foot pressure against the pedal. Further, the latch element can be coupled to the pedal via bearings that allow a limited amount of rotation (twist) therebetween to reduce stresses on the rider's knees.

As will be apparent from the description below, pedalling apparatus having a latch element and a socket element according to this invention provides efficient coupling, thereby reducing energy dissipation. The apparatus is simple and inexpensive to manufacture, is light in weight, is safe, efficient and easy to use, and is non-obtrusive and non-interfering during walking, or during pedalling activities when its use is not desired.

Pedalling apparatus according to the invention thus features a latch element that releasably and replaceably couples with a socket element. The latch action is with resilient bias and is along a latch axis that is directed longitudinally with the axis about which the pedal revolves. The latch action normally is effectively insensitive to, and remains coupled under, a forward foot thrust and under a downward foot thrust, in directions that are relative to the pedal. The latch action releases under selected non-pedalling levels of other forces, and of torques and moments about axes other than the pedal axis. Removal of the shoe from the pedal, i.e. release of the latch action with uncoupling of the latch element from the socket element, is automatic and essentially instantaneous, as with an intentional twisting action of the foot. The cyclist need not remove his or her hands from the handlebar in order to release the mechanism. Further, the latch and socket elements can immediately be re-coupled, without any re-setting or other preparation and again without manual efforts. The illustrations of the invention described in detail below also include embodiments wherein the force of the resilient bias can readily be adjustable, for example to accomodate different riding needs, and the orientation of the latch axis, relative to the pedal axis, can readily be adjustable with at least one or two degrees of freedom.

Among modifications which can be made in practicing the invention is the provision of a socket element separate from a rider's shoe. For example, a socket element as described above can be provided as a device separate from a shoe and which a rider can fasten to the underside of a shoe, suitably by way of straps or flexible clips. Similarly, latch elements are disclosed which can be adapted to conventional pedals. Further, when the socket element is incorporated into a shoe, it can be part of a multi-piece molded sole that has at least one flexible sole material, to enhance walking comfort, and a more dense socket material, to enhance force transfer and durability against stresses of the latch members. The latch element can also employ a disk and bearings which provide an adjustable orientation of the latch element about the vertical twist axis, and further which can either allow limited rotational slippage or be selectively locked to provide a stiff connection. In addition, the latch element can take the form of a one-piece pedal and latch block.

Other features, objects and advantages of this invention will become more apparent to one skilled in the art from the appended claims and the following detailed description taken with the drawings.

DRAWINGS

FIG. 6A shows response to longitudinal forces,

FIG. 6B shows response to twist torques,

FIG. 6C shows response to roll moments, and

FIG. 6D shows response to vertical forces;

FIG. 7 is a simplified view like FIG. 6A showing the latch element fully seated in the socket element;

FIG. 8 is a cross-sectional view of another latch element according to the invention and having a resiliency adjusting mechanism and latch member-guiding bushings;

FIG. 9A is a cross-sectional view of another latch element mounted on a pedal according to a further embodiment that has an adjustable mounting mechanism;

FIG. 9B is a view like FIG. 9A showing the latch element with an adjustable cant;

FIG. 9C is a detail bottom plan view of the embodiment of FIG. 9A;

FIG. 14A is a perspective view of a bicycling shoe according to the invention, incorporating shoe-cinching strap;

FIG. 14B is a partial cross-sectional end view of the show of FIG. 14A;

FIG. 16 is a perspective view of a socket-containing block according to invention which is adapted for connection to a conventional shoe.

DETAILED DESCRIPTION

Figure 1:
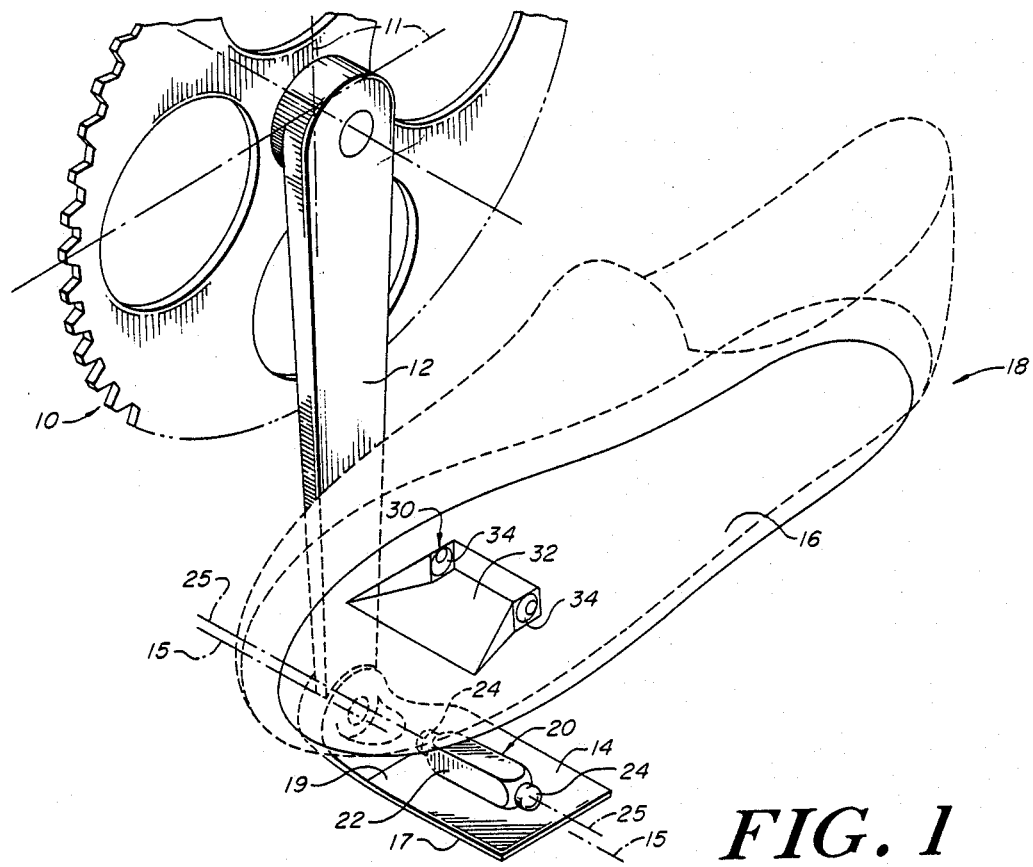
FIG. 1 is perspective view of pedal apparatus embodying the invention, shown in an uncoupled condition.

As shown in FIG. 1, a bicycle, a portion of which is generally designated 10, has a crank 12 that carries at least one pedal 14. The crank 12 is shown coplanar with a normally vertical plane 11. The pedal is mounted to revolve about a normally-horizontal pedal axis 15 in response to stroke forces exerted by a rider of the bicycle.

Pedal 14 is generally flat on one side, having a planar surface 17, and has a latch element 20 projecting outwardly from the other side 19. The pedal typically is weighted to revolve normally to an orientation in which planar surface 17 faces downwardly and latch element 20 faces upwardly. (The opposite bias can also be used, as well as a balanced weighting). The upwardly facing latch element meets a socket element 30 worn on the bicycle rider's foot. The socket element is arranged to engage the latch element 20 for releasably and replaceably coupling the rider's foot to the pedal 14. When the elements are thus engaged, the sole 16 of the rider's shoe 18 generally abuts the pedal surface 19 adjacent the latch element.

Figure 2:
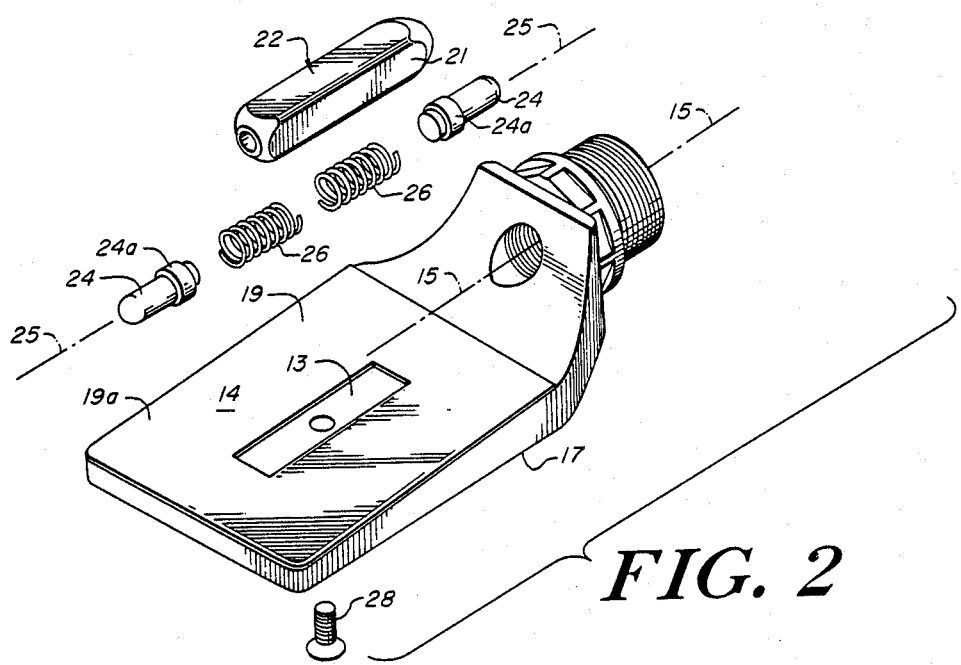
FIG. 2 is an exploded perspective view of the latch element of the pedalling apparatus shown in FIG. 1.
Figure 3:
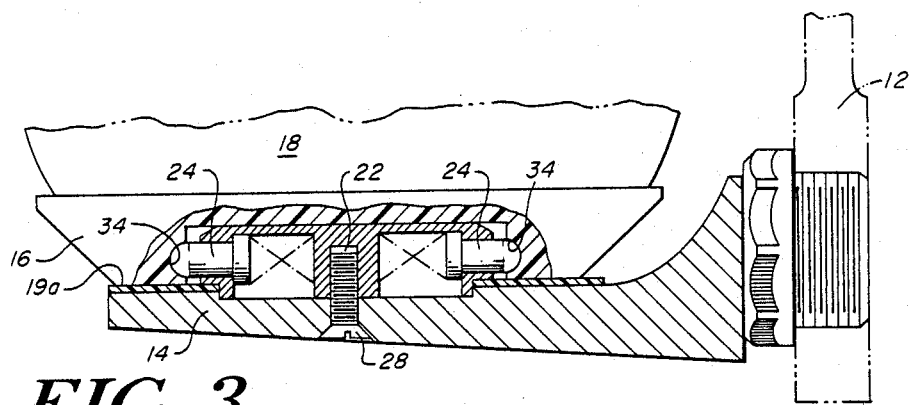
FIG. 3 is a cross-sectional end view of the pedalling apparatus of FIG. 1, shown in coupled condition.

The illustrated latch element 20, as shown in FIGS. 2 and 3, mountingly seats in a recess 13 in pedal surface 19 and is fastened to the pedal 14 by screw 28, which is recessed into planar surface 17. The latch element 20 has an upwardly projecting block 22, elongated along a latch axis 25. The latch block has a flat back wall that projects upwardly from the pedal, transversely to the pedal surface 19. This wall forms a forward thrust surface 21 for transfering forward thrust from the rider to the pedal. Block 22 has internal cavities that mountingly seat first and second plunger-like latch members 24, 24. The latch members are oppositely directed and aligned along the latch axis 25, and project outward, along the latch axis, from both ends of the latch block. The axis 25 is longitudinal with the pedal axis 15 and, in the embodiment of FIGS. 1-3, is parallel with the pedal axis. The cavities within latch block 22 also seat compression springs 26, 26 that resiliently bias each latch member pitestf, away from one another, along the latch axis 25. An annular shoulder 24a on each latch member limits its outward projection from the latch block.

The illustrated socket element 30, shown in FIGS. 4A-B and 5A-B, is disposed within and forms part of the sole 16 of a bicycling shoe 18. The socket element 30 has a latch-receiving recess 32 having opposed first and second latch seats 34, 34. The latch seats are arranged for releasably and replaceably coupling the opposed latch members 24 against the action of the resilient bias of the latch springs 26.

Figure 4A:
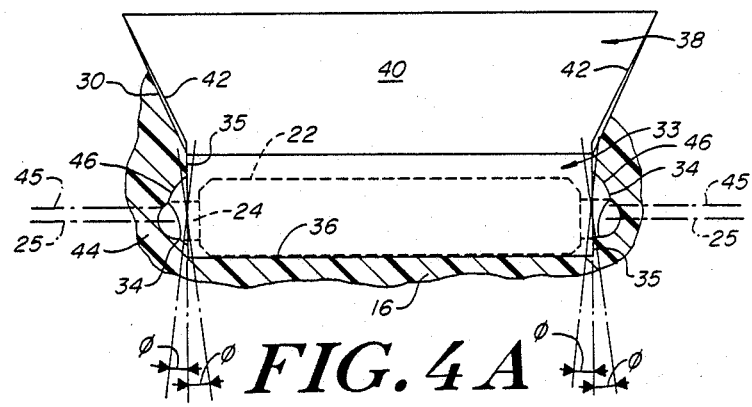
FIGS. 4A and 4B are bottom and end views, respectively, of a socket element in the sole of the bicycling shoe showing the latch element in phantom.
Figure 4B:
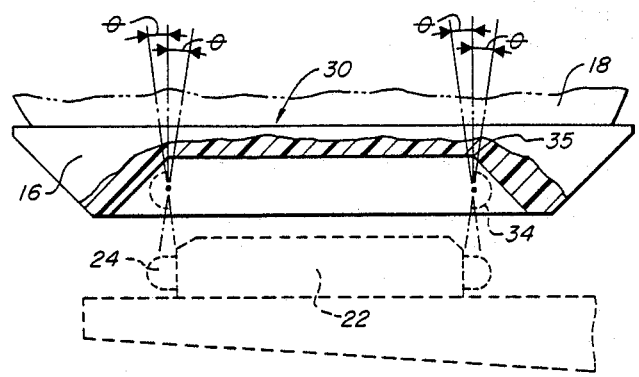
Figure 5A:
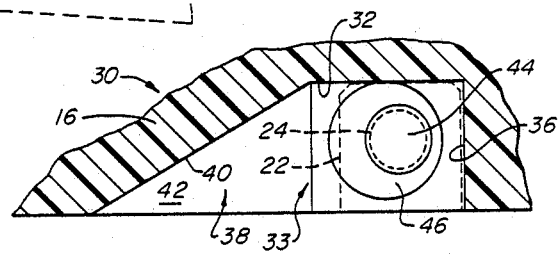
FIGS. 5A and 5B are transverse sectional views of the socket element of FIG. 4 showing the two stages of seating of a latch element, in accordance with a preferred feature of the invention.
Figure 5B:
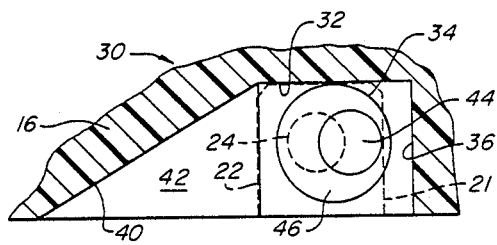

FIGS. 4A-B and 5A-B show an embodiment wherein each latch seat 34 is preferably structured to provide a two-stage latching action. For this purpose, each latch seat 34 has an inner major detent 46 offset from the latch axis 25. The two opposed major detents 46-46, aligned along a recess axis 45, seat the latch members 24-24 with a slight amount of resilient or elastic lateral freedom, as FIG. 5B shows. Each detent 46 is further recessed with a minor detent 44 centered on the latch axis 25. The aligned opposed minor detents 44-44 seat, with a snug fit, the latch members 24-24, as FIG. 4A shows. The major detents may be termed inner detents because they are not recessed as deeply as the minor detents, which correspondinly may be termed outer detents. Each minor detent 44 is not concentric with the major detent 46 which it recesses, but is rearwardly offset, i.e. to the right in FIGS. 5A and 5B. Correspondingly, the latch axis 25 is offset rearwardly from the recess axis 45. This double-acting latch seat structure allows coupling tolerance to absorb high impulse, short duration non-pedalling road shocks and vibrations, while still maintaining a connection, between the shoe and pedal. Once the shock dissipates, the latch members 24 return to the state of lowest energy, which is being seated in the minor detents 44. This position provides an acute and solid interface between each latch member 24 and the steeply inclined surface adjacent the rim of a minor detent 44. It is more acute, and therfore more solid, than the interface of latch members 24 and the shallower inclined surface near the rim of the major detent 46. The two-stage structure is considered to be an optional feature of this invention deemed preferable for high performance cycling operation, e.g., road racing on cobblestones or other rough surface.

With further reference to FIGS. 3 through 5, the socket recess 32 has a seat portion 33 that couples with the latch element 20, and a guiding portion 38 that guides the latch element into and out of the seat portion. The recess seat portion 33 is configured to matingly receive the latch element block 22. It accordingly has a back wall 36 forming the back side of the recess 32. This wall abuts against the back wall of the block 22, i.e., against the thrusting surface 21 of the latch element, when the latch element is fully seated in the socket recess, as in FIG. 5A, to transfer a rider's forward foot thrust to the cycling pedal 14. This thrust transfer is independent of the resilient latch and release mechanism. The latch-seating detents 46, 46 recess outwardly the sidewalls of the seat portion 33. The upper wall of the seat portion may, where desired, abuttingly engage the top of the latching element block 22 when the latch element is fully seated in the socket recess.

The recess guide portion 38 communicates with and extends forwardly from the seat portion 33, as FIGS. 4A and 5A-B show. The upper surface 40 of the guide portion is a downwardly-facing camming surface or ramp which extends forward from the front of the seat portion with decreasing depth in the recess. The latch element block 22 reacts with the camming surface 40 as a follower. The sidewalls 42,42 of the guide portion flare outwardly apart from the recess seat portion to form a further funnel like structure for guiding the latch element into the seat portion. The flared sidewalls thus provide the guiding portion of the recess with progressively decreasing longitudinal width with increasing distance into the recess toward the seat portion.

FIGS. 4A and 4B also show that the side walls 35 of the socket seat portion 33 can be tilted or angled in the longitudinal direction (as illustrated by the angle phi in FIG. 4A) and the vertical direction (as illustrated by the angle theta in FIG. 4B) to optimize safety and control. Typically, the angles phi and theta will be small (e.g., plus or minus five or less degrees from perpendicular or normal to the latch axis 25.) Variation in the angle theta will adjust the vertical force roll moment necessary for release. Varying the angle phi will adjust the torque necessary for twist release and ajust the longitudinal shear interaction between the socket and latch elements. By controlling the relative tilting in both directions, the combination of twist torque and longitudinal shear relative to vertical force and roll moments, necessary for release can also be controlled. The optimal angles for a particular application, which may differ for different walls, depend on the materials, the coefficients of friction of the contacting surfaces, the hardness of the elements, the depth of the recess 32, the modulus of elasticity of the springs 26, the pre-load on the springs, and the shape of the ends of the latch members 24.

As noted, the socket element 30 preferably is an integral part of the sole of a bicycling shoe. A cyclist wearing such a shoe may walk comfortably, and ride a bicycle having other pedals, because the socket element 30 is disposed fully within the sole 16 (FIG. 1). It does not extend beyond the surface of the sole, as do cleats, and therefore does not interfere with normal walking and other activities, and does not wear-out, like cleats do.

After mounting a bicycle 10 that is equipped with a latch element 20 on each pedal, the rider decides whether to couple the socket elements with the latch elements. When a cyclist choses to ride without this foot-to-pedal coupling, each pedal is flipped about the pedal axis 15 so that the planar surface 17 faces upwardly toward the shoe sole. Even in case the shoe has a socket element 30, it does not interfere with pedalling on this surface. Further, the latch element 20 is arranged on pedal 14 so that when the element 20 is facing away from the socket element 30 and the bicycle 10 is angulated during extreme cornering, the pedal 14 will scrape the ground before the element 20 scrapes. This enhances the durability of the socket element.

When the rider chooses to couple to the pedals, the normally weighted pedals in the preferred embodiment dispose each latch element 20 upward to face the shoe sole 16. The cyclist accordingly simply steps down on the pedal 14, preferably with the heel turned slightly outward, and the geometry of the recess 32, and in particular of the ramp 40 and flaired sidewalls 42, translates the stepping down force into a combination of forces that guide the latch block 22 into the socket recess 32.

Figure 6A:
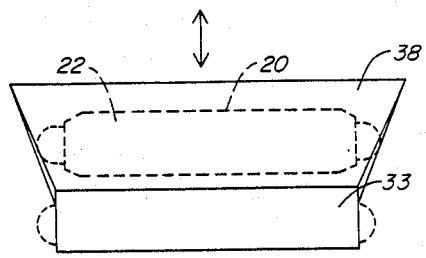
FIGS. 6A–6D are simplified showings of different coupling and release actions of the latch and socket elements of FIG. 1, i.e.
Figure 6B:
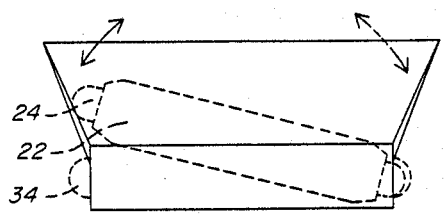
Figure 6C:
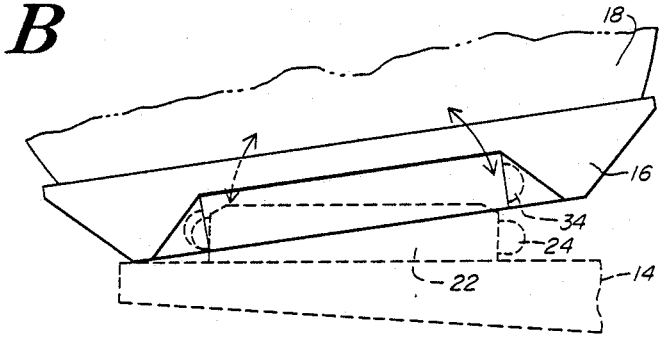
Figure 6D:
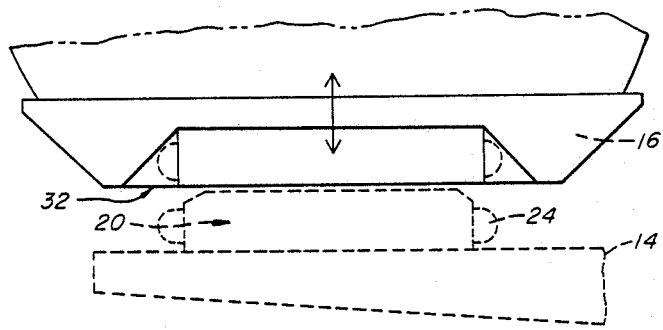

FIGS. 6A-6D show the seating and releasing of the latch block in the socket recess under different conditions, and FIG. 7 shows the fully-seated condition. In particular, FIG. 6A shows the latching and releasing operations when the latch element moves longitudinally into and out of the socket element. FIG. 6B shows that a rider can latch the elements together or release them with a twisting movement of the foot, and FIG. 6C shows the latching and releasing action with a roll movement of the foot. FIG. 6D shows latching and releasing with the socket element moving vertically with respect to the latch element.

The relative ease of latching in each of the different directions which FIGS. 6A, 6B, 6C, and 6D illustrate may vary. It is deemed preferable that the latch element 20 and socket element 30 release under a twist motion (FIG. 6B) at a level above normal riding conditions and yet well below rider discomfort, so that it is the easiest direction for intentional, self-actuated release, and conversely for latching.

As the latch block 22 enters the seat portion 33 (FIG. 6B), the projecting latch members 24 engage in latch seats 34. When the latch and socket elements are fully coupled (FIG. 7), the resilient bias of the latch members retains the block 22 within the recess 32. The normal outward resilient bias causes the members 24 to seat within the outer, minor detents 44 (FIG. 5A).

The minor detents 44, disposed within recess 32 more rearwardly than the major detents 46, preferably seat the latch members with snug fit throughout the application of a typical pedalling load. When the latch and socket elements are thus coupled, the socket back wall 36 abuts against the forward thrust surface 21 of block 22, and aids in transfering forward thrust from a rider's foot to the pedals. When a large, non-forward or non-downward load causes the latch members to retract a small amount and unseats the latch block from the minor detents, the continued resilient bias in the inner, major detents 46 (FIG. 5B) maintains a latched connection of the pedal and shoe, for continued riding control. In this manner, the latch block 22 remains held within seat portion 33 against the pedalling-level forces of vertical and longitudinal loads and of different rotational stresses. When these loads dissipate, the latch members again seek the state of lowest energy, and seat in the minor detents 44.

The latch and socket elements 20, 30 automatically release and separate under load levels greater than those employed in pedalling and yet lower than those likely to cause injury or other trauma to the rider. The release levels thus are well below the biomechanical failure thresholds of the foot-ankle-lower leg system along and about the vertical, longitudinal and lateral axes. A forward fall, for example, typically causes the cyclist's ankles to hyperextend and causes the foot to exert a shearing force on th pedal to effect release with the action which FIG. 6A illustrates. A fall of a rider to the side typically causes a roll load higher than encountered in normal pedalling and which causes the shoe to separate from the pedal, as shown in FIG. 6C. This release action occurs below the rider's biomechanical threshold and hence without causing tissue or bone to separate. Another fall can cause the rider to be thrown forward, in front of the bicycle. This fall can produce a vertical shear release as shown in FIG. 6D. Other falls may cause the rider's body to twist relative to the bicycle at a level that is higher than that of typical pedalling, resulting in a twisting release as shown in FIG. 6B.

Falls in bicycling are complex in direction, and can vary markedly. Therefore, it is a significant achievement of this invention to maximize the directions in which release can occur, without sacrificing the potential for pre-release. The equipment which the invention provides blocks two highest load directions, i.e. downward and forward, so that their bias does not cross-couple into the lower release limits of the primary release directions which FIGS. 6A, 6B, 6C and 6D illustrate, and hence does not cause pre-release. In addition, a cyclist can voluntarily, i.e. intentionally, decouple the shoe 18 from the pedal 14 by twisting the foot about the twist axis, i.e. with the action shown in FIG. 6B. After any release, however, the latch element 20 and the socket element 30 are immediately ready for recoupling.

Note that the foregoing combinaton of cycling latch and socket element is driven to completely block separation and remain coupled by the downward and forward thrusts that are typical in cycle pedalling. Even slightly off-center forward shears are blocked, due to the wide width of the surface 21 on the pedal block 22 and of the recess wall 36 (FIGS. 5A and 5B). Pure lateral thrusts also do not cause release.

FIG. 7 shows an optional modification of the recess wall 36 in which it has flat, coplanar end portions 36a, 36a, for abutting the latch block 22, and has a relieved, concave central portion 36b that accomodates dirt and other contaminants without interferring with the engagement and seating of latch member 20 in the socket member 30.

The structure and operation of other embodiments of latch element 20, shown in FIGS. 8–16, closely parallel the embodiments shown in FIGS. 1–7. Therefore, many details in the above description are not repeated below, and corresponding elements in FIGS. 8–16 are designated with the same reference numeral, followed by a superscript prime or double prime.

FIG. 8 shows a latch element 20' that has a tensioning structure 50 for adjusting the resilient spring bias acting on the latch members 24', 24'. Specifically, the latch block 22' mounts a rotatable threaded stem 54 that carries an externally accessible knob 52. Turning the knob rotates the stem to move threaded nonrotating plates 56, 56 toward or away from each other along latch axis 25'. This movement adjustably changes the compression of the springs 26', each of which is compressed between a plate 56 and a latch member 24'. Also shown in FIG. 8 are annular bushings 23', 23' disposed within block 22' and slidably fitting around the latch members 24', 24' to provide low-friction guides for the latch members. The bushings 23', 23' increase the resilient action and the shock absorbing properties of the latch element 20', while reducing wear. The bushings 23', 23' can be formed, for example, from oil-impregnated bronze or self-lubricating plastics. It should be clear that the tensioning means and bushing means described in connection with FIG. 8 can be incorporated into other latch elements embodying the invention.

FIGS. 9A-D show a latch element 20" that mounts to a pedal 14" with two degrees of adjustment of the latch axis 25" relative to the pedal axis 15". The adjustably-mounted latch element 20" has a latch block 22" secured on a mounting disk 60 that mounts to the pedal 14". The latch block 22" carries resiliently-biased latch members 24", 24" that protrude outwardly from the block along a latch axis 25", in much the same manner as in FIGS. 2 through 5.

The illustrated mounting disk 60 has a truncated circular periphery 62, and a flat upper surface 64 to which the latch block 22" is secured, preferably centered on a diameter of the circular periphery. The disk 60 and latch block 22" thus move as a unitary one-piece unit. The lower surface 66 of the mounting disk 60 is spherically rounded. The pedal 14" has a mating spherically rounded mounting seat 68 recessing the pedal surface 19".

The block-carrying disk 60 thus matingly seats in the pedal seat 68. The disk is normally seated with the upper surface 64 in a normally-horizontal plane, as appears in FIG. 9A, so that the latch axis 25" is parallel with the pedal axis 15" in the plane of FIG. 9D. However, to accommodate a different rider's foot posture, the disk can be rolled, as indicated with arrows 70, 70 in FIG. 9A. This roll adjustment, shown in FIG. 9B, provides a selected cant to the latch element 20" and correspondingly to the disk surface 64 against which the rider's shoe sole presses.

Figure 9D:
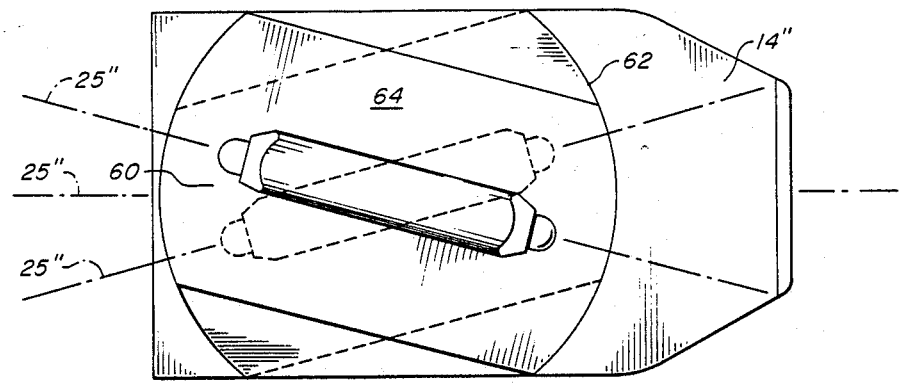
FIG. 9D is a top plan view of the pedal shown in FIG. 9A, showing the latch element, in bold and in phantom, oriented along different latch axes.

With further reference to FIGS. 9A-D, the latch element 20" can also be rotated in the plane of FIG. 9D, i.e. about the twist axis, to offset the latch axis 25" relative to the pedal axis 15" in the plane of FIG. 9D. This adjustment accommodates certain foot postures. The mating spherical disk surface 66 and the pedal seat 68 preferably are provided with abrasive finishes to enhance secure positioning of the latch element 20" relative to the pedal 14" with the foregoing selected orientation.

The adjustably-mounted latch element 20" is secured in any of these positions by means of a mounting screw 28" that seats in the pedal 14" and threadably engages the latch block 22". The screw 28" passes through a slot 74 through the pedal 14 and elongated parallel to the axis 15", i.e. along the lateral diameter of the spherical seat 68. The slot 74 has an arcuate recess 78 of increased width extending along the surface 17" that provides a recessed surface for the head of the screw 28". The inner, arcuate surface 79 of the recess of 78 is curved to correspond with the curvature of the disk surface 66 and of the seat 68, in the plane of FIGS. 9A and 9B. The disk 60 thus carries the mounting screw 28, and the screw slides along the slot 74, as in a guide, as the disk is canted to a desired orientation, as in FIG. 9B, relative to the pedal 14". Tightening the screw 28" within the latch block 22" and against the arcuate surface 79 clamps the disk 60 to the pedal 14" in the selected cant position.

Figure 10A:
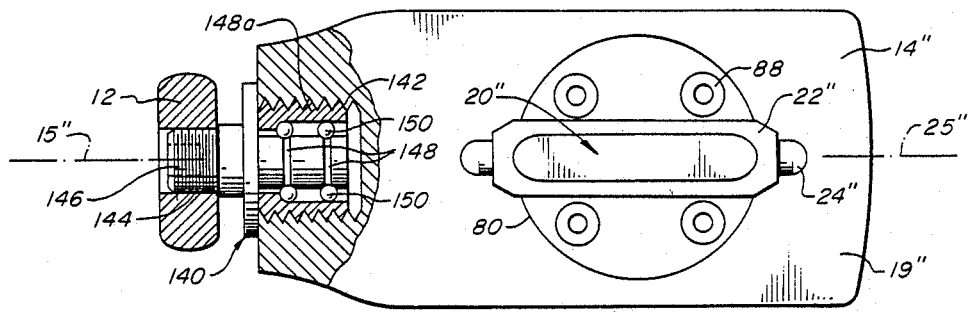
FIG. 10A is a top plan view of another latch element mounted on a pedal according to the invention which permits limited rotation slippage or adjustable and lockable latch axis orientation.
Figure 10C:
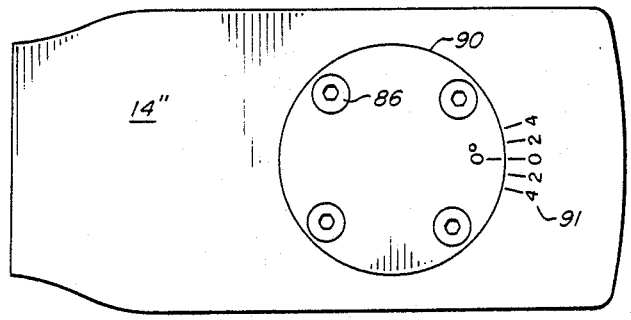
FIG. 10C is a bottom plan view of the latch element of FIG. 10A.
Figure 10B:
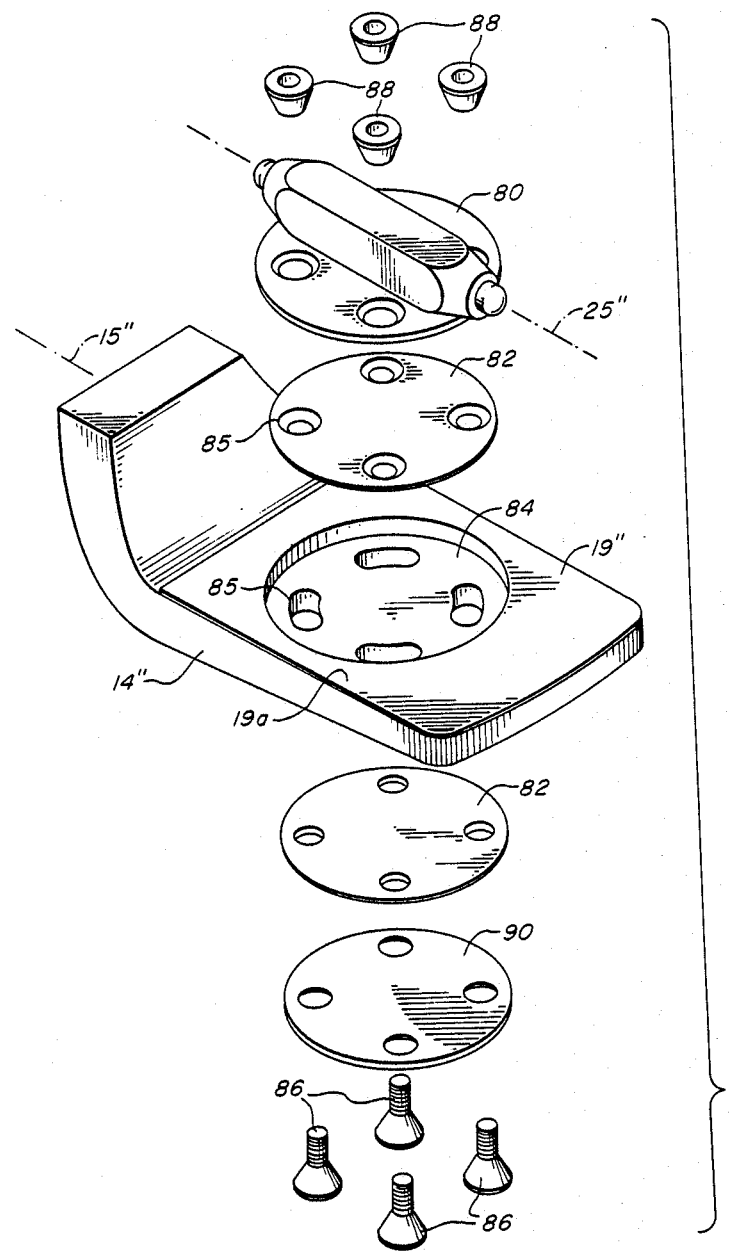
FIG. 10B is an exploded perspective view of the latch element and pedal of the embodiment shown in FIG. 10A.

FIGS. 10A-C show another embodiment wherein a latch element 20" can be rotated to offset the latch axis 25" relative to the pedal axis 15" to accomodate certain foot postures. The embodiment of FIGS. 10A-C also has low-friction bearings 82 which allow rotational relief for cyclists with knee problems, such as chondromalacia patellae. Twisting to exit, i.e. release, can still be accomplished since the rotational relief is limited. The slip bearings 82 can be omitted and, additionally, rotational relief can be overridden by sufficient tightening of the mechanism, thereby providing a stiff connection.

With reference to FIGS. 10A-C, the illustrated a latch element 20" has a spring block 22" fixedly mounted upon an upper disk 80 for connection to pedal 14". As can be seen in the exploded view of FIG. 10B, pedal 14" has a circular recess 84 in its upper surface 19", into which the upper latch-mounting disk 80 fits. Optionally, a low-friction disk-shaped slip bearing 82, formed from a fluoropolymer material such as tetrafluoroethylene (Teflon) or the like, can be disposed within the recess 84 between disk 80 and the pedal 14". As further shown in FIG. 10B, a similarly shaped lower disk 90 and a lower disk-shaped bearing 82 can be disposed within another recess in the lower surface of pedal 14".

The disks 80 and 90, upper and lower bearings 82, 82, and pedal 14" are held together in the illustrated embodiment by a set of bolts 86 which pass through aligned holes 85 in each of the components and are secured together by flush-mounted nuts 88. The bolts 86 are accessable from the bottom of the pedal 14" so that rotation can be adjusted, controlled or locked while the foot is still latched to the pedal. As shown in FIG. 10B, the holes 85 in pedal 14" preferably are arcuate slots which allow the user to adjust the orientation of the latch axis (or to allow limited rotation when slip bearings 82 are employed). A vernier scale 91 on the bottom of pedal 14" can be used to precisely set and display the offset angle of the latch axis relative to the pedal axis. The lower disk 90 carries an index marker opposite the vernier scale.

Another preferred element is that the upper surface 19" of pedal 14", shown in FIGS. 10A and 10B, is coated with a replaceable polytetrafluoroethylene (Teflon) or similar low friction polymeric material layer 19A to maintain a selected low coefficient of friction with the cyclist's shoe. (The embodiment of FIGS. 2 and 3 is also illustrated as including such a low-friction layer 19A.)

Also shown in FIG. 10A is a preferred bearing 140 which connects a pedal 14", carrying the latch means of the present invention, to the bicycle crankset 12. The bearing 140 includes a first, pedal-mounting collar-like stem 142 with external threads adapted to be screwed into a threaded recess in pedal 14". The bearing also has a second crank-mounting stem 144 with external threads adapted to be screwed into the crankset 12. In the illustrated embodiment a hex-nut opening 146 is formed in stem 144 to allow the cyclist to tighten the crank-mounting stem 144 to the crank 12. The pedal-mounting stem 142 rotates freely about the crank-mounting stem 144 by means of outer raceways 148A concentric with inner raceways 148B, and ball bearings 150 disposed therebetween.

Figure 11:
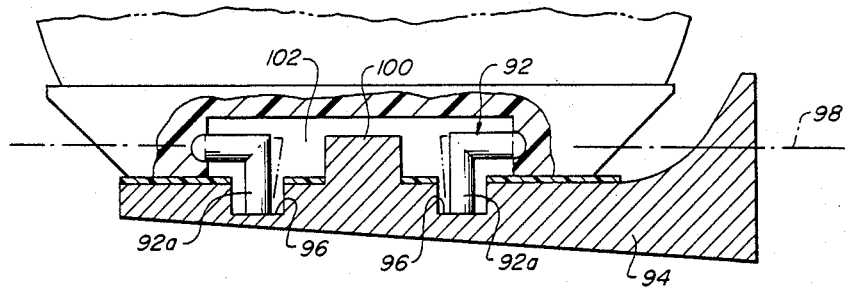
FIG. 11 is a cross-sectional view of a further embodiment of pedalling apparatus according to the invention and in which the latch members include resilient rods; the phantom showing illustrates the resilient flex of the rods.

FIG. 11 shows that the invention can also be practiced with a resiliently deformable one-piece latch element 92 that has a pair of latch rods 92a, 92a secured to a pedal 94, in lieu of the spring-biased latch members 24 and latch block 22 of FIGS. 2 through 5 and other embodiments of FIGS. 8-10. Each illustrated latch rod 92a is curved through one 90° quadrant, as with an L-shape. A base end of the rod is fixed to the pedestal, suitably within a recess 96 in order to accommodate additional length of the rod 92a. The other, plunger end of the rod 92a projects outwardly, along a latch axis 98, in a manner similar to the previously-described embodiments. Also fixed to the pedal 94, within the space between the latch rods 92a, 92a along the latch axis 98, is an upwardly-projecting forward thrust block 100. The block is arranged to abut against the back wall 92 of the socket element with which the latch element 92 seats. Each latch rod 92a has sufficient resilience to couple with and release from a socket element such as the socket element 30 described above, and the forward thrust block 100 aids in transferring forward thrust from a rider's foot to the pedal. The action of the resilient latch rods 92a, 92a of FIG. 11, in coupling with a latching socket element and in releasing from such a socket element, may be similar to that described above with regard to the constructions of FIGS. 1 through 7.

Figure 12:
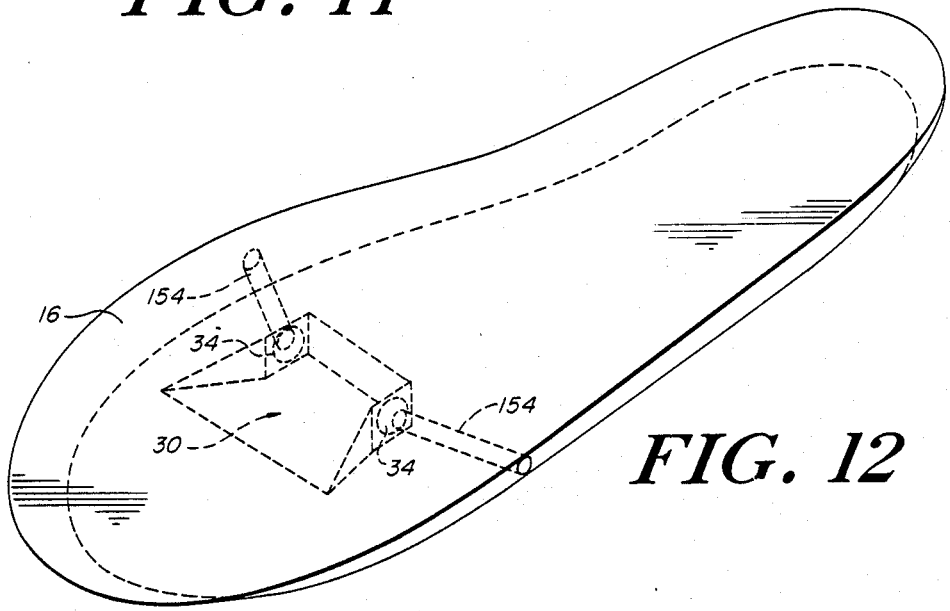
FIG. 12 is a perspective view of a shoe sole according to the invention, showing a socket element and debris-removing ports in phantom.

FIG. 12 illustrates an embodiment of the socket member of the invention which disposes of dirt and debris which might otherwise accumulate at the detent-latch member interface. Shown in FIG. 12 is a shoe sole 16 carrying a socket recess 30 having seats 34, 34 adapted to receive a latch member as described in connection with other embodiments. However, in the embodiment of FIG. 12, the sole 16 further includes two ports 154, 154 which provide passageways from the socket recess 30 to the outer side surfaces of the sole 16. The ports 154, 154 allow contaminants to be forced out of the sole 16 rather than accumulate around the release mechanism. In one preferred embodiment, the size of the ports is roughly one-third the diameter of the detents, and the elongations of the ports flare backwards, as shown, to reduce entry of water and dirt into the recess 30.

Figure 13:
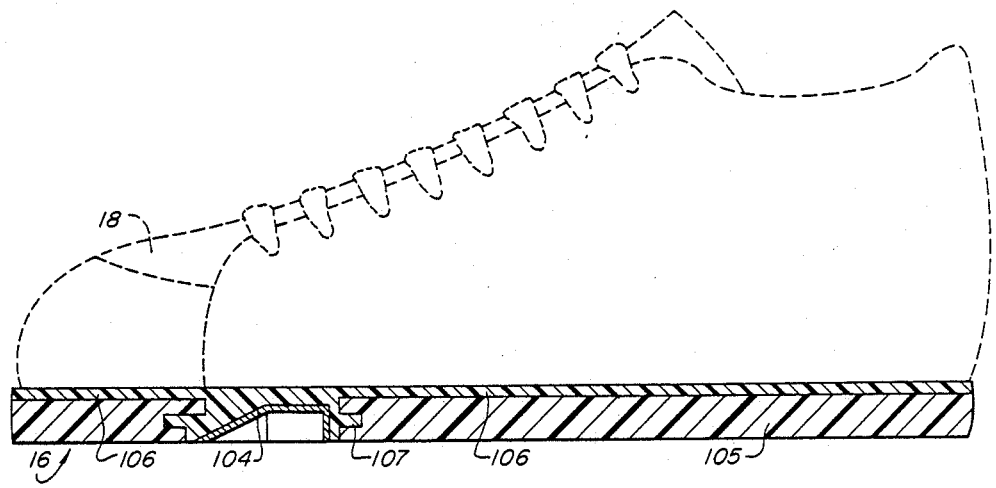
FIG. 13 is a side plan view of a two-piece shoe sole, incorporating a socket element according to the invention.

FIG. 13 shows a multi-element sole 16 for a cyclist's shoe 18 which consists of a hard, wear-resistant socket liner 104 and a more flexible and resilient sole plate 106 to enhance walking comfort. The sole can be constructed by first molding the socket liner 104 and then molding or otherwise joining a more flexible sole plate 106 to the liner. In one preferred embodiment, the socket liner 104 is formed from a urethane polymer such as cyanaprene, made by American Cyanamid, or other synthetic resin or even be formed of a metal which has high tear strength. The sole plate 106, which provides a load-distributing function, can be formed from conventional materials used for athletic shoe soles such as PEBAX, manufactured by ATO Chemical Company. The illustrated embodiment has a third sole element, namely a cushion 105, of a low-density, highly flexible filler material such as ethlene vinyl acetate. To provide a strong interlock between the cushion material 105 and the sole plate 106, a tongue-and-groove type interface 107, as shown in FIG. 13, can be employed.

FIGS. 14A and 14B illustrate another feature of the present invention in which a cinch strap 108 is provided to reinforce the bond between the upper portion of the shoe 18 and the sole 16, at the region above the ball of the foot, thereby giving powerful forefoot support. This type of shoe reinforcement is deemed highly desirable to attain full benefit of the cycling performance which the invention makes possible. As shown in detail in FIG. 14B, the cinch strap 108 includes a first strap portion 110 embedded or otherwise permanently secured to one side of the sole 16 and a second strap portion 114 similarly secured to the other side of the sole. The second strap portion 114 is wrapped around the upper portion of the shoe 18 and secured to the first strap 110 portion by a buckle 112. In the illustrated embodiment, the first strap portion 110 is permanently fastened to the buckle 112, while the tightness of the second strap portion 114 is adjusted by a hook and loop (Velcro-type) or like fastener.

Figure 15:
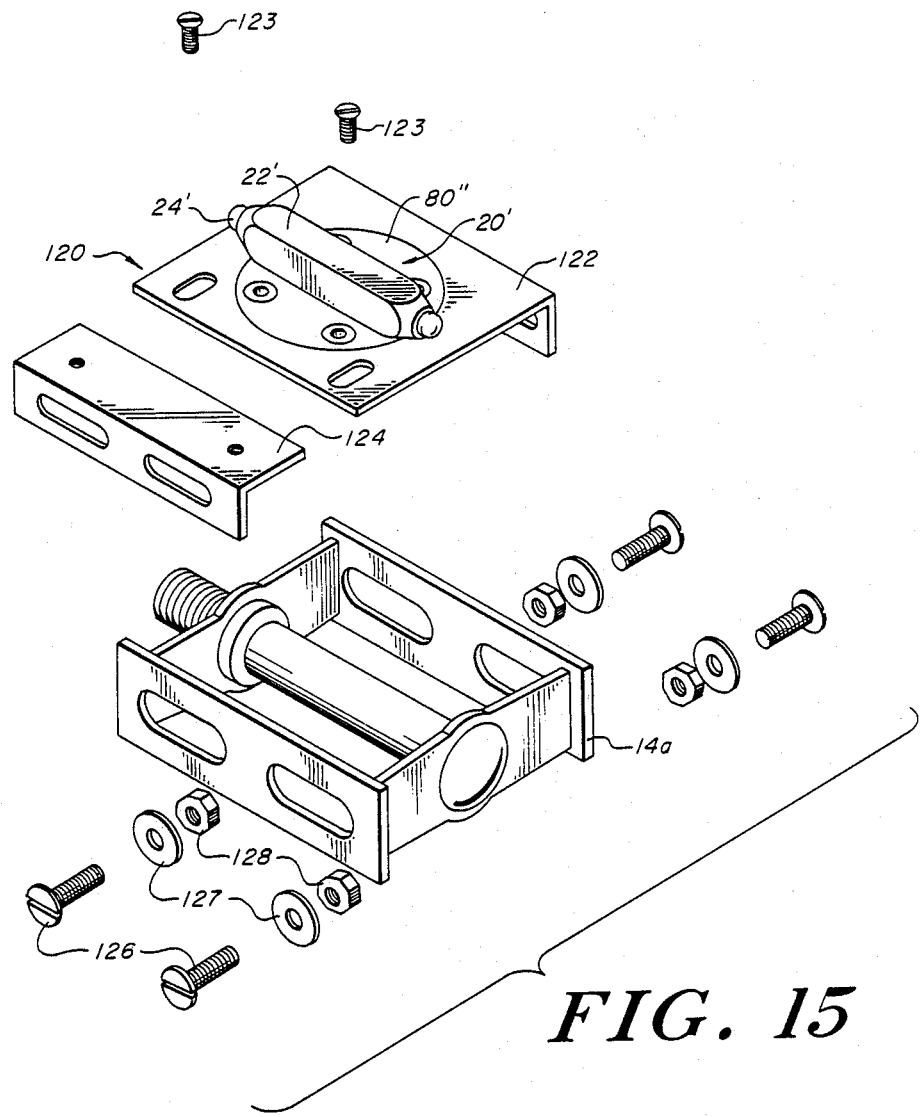
FIG. 15 is an exploded perspective view of a latch apparatus according to the invention which is adapted for mounting on a conventional pedal.

A pedal adapting apparatus 120 is shown in FIG. 15 to permit the use of the invention with a conventional pedal 14a. The pedal adapting apparatus 120 includes a mounting plate 122 carrying a disk 80" upon which is disposed a latch element 20' having a spring block 22' and latch members 24', 24'. The disk 80' and latch element 20' can be similar in construction, for example, to the apparatus of FIGS. 10A-C and can further optionally include bearings which allow limited rotational slippage or selective adjustment and locking of the latch axis as described above. The pedal adapting apparatus 120 also includes a flange 124 adjustably connected to the mounting plate 122 by bolts 123, as shown, or similar fastening mechanisms to accomodate pedals of varying widths. The mounting plate 122 and flange 124 further include side holes; bolts 126 pass through these side holes and aligned holes in the conventional pedal 14a (washers 127 may also be employed) to secure the adapting apparatus to the pedal. Other fastening, clamping or clipping mechanisms can be used interchangeably with the illustrated nuts and bolts to secure the apparatus 120. The mounting plate 122 can also include a low-friction upper surface similar to that shown in FIG. 10B.

FIG. 16 illustrates a shoe-adapting apparatus 130 to permit the use of the invention with a conventional shoe. The shoe adapting apparatus 130 consists of a sole plate 132 in which is formed a socket element 30 having seats 34 which are adapted to receive the latch element of the invention. The socket element is similar in construction to those described in connection with FIGS. 1-7 above. The shoe adapting apparatus also includes one or more straps 134 to secure the plate 132 to a conventional shoe. A heel strap 134A is also be employed. The straps 134 can, for example, be similar in construction to the adjustable cinch strap described above in connection with FIG. 14B.

It will thus be seen that the objects set forth above, among those made apparent from the preceding description, are efficiently attained. Since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Pedalling apparatus for releasably and replaceably coupling a rider's foot to a pedal arranged to revolve about a pedal axis, said pedalling apparatus having the improvement comprising
    A. latch means upwardly projecting on said pedal and having first and second latch members selectively directed along a latch axis longitudinal with said pedal axis,
    B. at least one said latch member being deflectable and resiliently biased relative to the other along said latch axis,
    C. means forming a thrust surface on said latch means arranged for extending vertically and longitudinally relative to said pedal axis, and
    D. releasable, seating means arranged for wearing on a rider s foot and having a latch-receiving recess for replaceably receiving said latch means and having first and second selectively directed latch seats for releasably and replaceably coupling by seating, against the action of said resilient bias, said latch members of said latch means received in said recess,
    E. said recess of said seating means having a seating portion that mountingly receives said latch means when seated therein and having means forming a surface which engagingly abuts said thrust surface of said latch means received therein in response to at least a forward cycling thrust of the rider's foot, said recess further having a guide portion forward of said seating portion for receiving said latch means for accomodating selected relative movement of said latch means longitudinally backward into and forward out of said seating portion,
    F. whereby said seating means resists unseating of said latch means coupled therewith and transmits to said latch means a cycling thrust in response to pedalling forces and movements, and said latch means unseats from said seating means in response to selected non-pedalling actions.

2. Pedalling apparatus for releasably and replaceably coupling to a rider's foot and having a pedal arranged to revolve about a pedal axis, and having means forming a substantially flat and upwardly facing pedal surface for receiving pedalling action during a downward pedalling stroke, said pedalling apparatus having the improvement comprising
    A. latch block means on said pedal upwardly projecting on said pedal surface,
    B. means on said latch block means forming a normally vertically extending back surface longitudinal with said pedal axis for receiving pedalling action from a rider during a forward pedalling stroke,
    C. said latch block means having latch structure consisting of first and second latch members selectively directed and aligned along a latch axis longitudinal with said pedal axis, said latch members being arranged for receiving pedalling action at least during an upward pedalling stroke,
    D. at least one of said latch members being deflectable and having resilient biasing means for biasing that member relative to the other along said latch axis, and
    E. said latch members being arranged for retracting along said latch axis, against said resilient bias, in response to non-pedalling forces exerted thereon and directed along said latch axis, whereby said apparatus releases from coupling to a rider's foot upon non-pedalling action directed to separated the rider's foot from the pedal along a normally vertical axis and rearward along a normally horizontal axis transverse thereto, where said normally vertical axis is longitudinal with the normally vertical extension of said back surface and is transverse to said pedal axis, and where said normally horizontal axis is transverse to said back surface and to said pedal axis.

3. Cycling apparatus for releasably and replaceably coupling a cycle pedal to a foot-carried element, said pedal being arranged to revolve about a normally horizontal pedal axis, said apparatus comprising A. latch means upwardy projecting on said pedal with one pair of first and second latch members selectively-directed and aligned along a latch axis longitudinal with said pedal axis, B. at least one of said latch members being deflectable and resiliently biased relative to the other along said latch axis, C. said latch members being adapted and arranged for releasable and replaceable coupling seating in a latching recess normally facing downwardly on the foot-carried element, and D. said latch means being elongated along said pedal axis and having a normally vertically extending surface longitudinal to said pedal axis, for engagement with a correspondingly oriented surface on the foot-carried element during forwardly-directed pedalling strokes without unseating of said latch means from the foot-carried element, for transmitting to said pedal a cycling thrust in response to pedalling forces and movements exerted by the rider, and said latch elements releasing, against said resilient bias, from coupling seating with the foot-carried element, in response to selected non-pedallying upward, rearward, twist and roll action of the foot-carried element.

4. Pedalling apparatus for releasably and replaceably coupling a rider's foot to a latching pedal arranged to revolve about a pedal axis, said pedalling apparatus having the improvement comprising A. releasable latch-seating means arranged for attachment below the foot of a rider, and having means forming a substantially flat lowermost walking surface, B. said seating means having means forming a latch-seating recess recessing said walking surface, said recess being adapted to matingly receive and resiliently couple with a pedal-carried latch element, elongated along a latch axis longitudinal with the pedal axis, upon vertical downward longitudinal forward, and rotational twist movement of said latch-seating means relative to the latch element, C. means forming a normally vertically extending and forward-facing surface of said recess extending longitudinal with said latch axis for transmitting pedalling action, to a latch element seated in the recess, during a forward pedalling stroke, D. said seating recess having one pair of first and second latch seats therein selectively alinged and directed along a latch axis longitudinal with said pedal axis, said latch seats being arranged for transmitting pedalling action to a latch element seated in the recess, at least during an upward pedalling, stroke, and for resiliently unseating from the latch element in response to non-pedalling action of the apparatus directed vertically upward and laterally rearward, and directed about the twist axis and about the roll axis, and E. said seating recess haivng a guide portion forward of said latch seats for receiving the latch means on a pedal and for guiding the received latch means into said coupling with said latch means.

5. Cycling apparatus for attachment to the underside of the foot of a cyclist and releasably and replaceably coupling the foot to a latching pedal that revolves about a normally-horizontal pedal axis, sad apparatus comprising A. releasable seating means having a walking surface free of pedal-engaging projection and having a normally downwardly-facing latch-receiving recess with first and second latch seats therein aligned along an axis longitudinal with the pedal axis for releasably and replaceably resiliently couplingly seating latch means on the pedal having a pair of resiliently biased latch members directed along a latch axis longitudinal with the pedal axis, said recess having a guide portion forward of said latch seats for receiving the latch means on the pedal and having recess-forming walls for guiding the latch means into said coupling seating with said latch seats, B. said seating means having a normally vertically oriented surface extending longitudinal with the pedal axis for engagement with a correspondingly oriented surface on the latch means during forwardly-directly pedalling strokes without unseating of the latch means, for transmitting to said pedal a cycling thrust in response to pedalling forces and movements, and c. said recess-forming walls and latch seats being further adapted for releasing resiliently from the latch means in response to selected non-pedalling upward, rearward, twist and roll actions of the seating means relative to the latch means.

6. Cycling socket apparatus for releasably and rerplaceably coupling a cyclist's foot to a latching pedal that revolves about a normally-horizontal pedal axis, said apparatus having the improvement comprising A. socket means having a walking surface free of pedal-engaging projections and having a downwardly-facing latch-receiving recess with a forward guide portion and with one pair of latch seats aliged along a latch axis longitudinal with said pedal axis for releasably and replaceably couplingly seating a pair of opposed latch members carried on said pedal and resiliently biased along an axis longitudinal with the pedal axis, B. said socket means being adapted to receive and to couple resiliently with the latching pedal, with said latch seats releasably seating the latch members, upon vertical downward, longitudinal forward, and rotational twist movement of said socket means relative to said latch means, C. said socket means having a normally vertical surface extending longitudinal to said pedal axis for engagement with the latching pedal during pedalling strokes without unseating therefrom for transmitting to said pedal a cycling thrust in response to pedalling loads, D. said socket means resisting unseating of the latching pedal coupled therewith, and transmitting to said pedal a cycling thrust in response to pedalling loads, and releasing resiliently upward, rearward and twist actions of said socket means.

7. Pedalling apparatus for releasably and replaceably coupling a rider's foot to a pedal arranged to revolve about a pedal axis, said pedalling apparatus having the improvement comprising A. latch means upwardly projecting on said pedal with two opposed latch members selectively directed along a latch axis longitudinal with said pedal axis, said latch axis and a longitudinal axis transverse therewith being in a normally horizontal plane and said upward projection normally being vertical, B. socket means arranged for wearing on a rider's foot and having a latch receiving recess with two opposed latch seats for releasably and replaceably coupling said latch members, C. means for providing deflection of said two latch members relative to said latch seats along said latch axis and for providing resilient bias against said deflection, D. said socket recess being adapted to effect said receiving and coupling of said latch means with selected movement of said socket means relative to said latch means, said selected relative movement including at least any of vertical downward movement, longitudinal forward movement and twist movement, E. whereby said socket means resists unseating of said latch means coupled therewith and transmits thereto a cycling thrust in response to pedalling movement of a rider's foot, and unseats from said latch means in response to selected non-pedalling movement.

8. Pedalling apparatus according to claim 7 comprising the further improvement wherein said socket recess has A. a latch seating portion which includes said two latch seats and is arranged for receiving said latch means, and B. a front guiding portion extending longitudinally forwardly of said seating portion for guiding said latch means into and out of said seat portion upon movement of said latch means longitudinally relative to said socket means.

9. Pedalling apparatus according to claim 8, having the further improvement wherein A. said latch means has upwardly-facing follower means, and B. said socket means has downwardly-facing calming means extending longitudinally along said front guiding portion thereof and providing said socket recess with progressive depth from the front thereof to said seating portion.

10. Pedalling apparatus according to claim 8, comprising the further improvement wherein said socket recess has inwardly-facing sidewall means extending along said front guiding portion forwardly of said seating portion, said sidewall means flaring apart to have progressively increasing width between them forwardly of said seating portion.

11. Pedalling apparatus according to claim 7, comprising the further improvement wherein A. said latch means has forward thrust means, said thrust means projecting upwardly on said pedal and extending longitudinal to said latch axis for receiving forwardly-directed pedalling movement, and B. said socket recess has a downwardly projecting backwall portion disposed for abutment against said forward thrust means of said latch means coupled with said socket means.

12. Pedalling apparatus according to claim 7, having the further improvement

A. wherein said resiliently biased two latch members comprise first and second spring-tensioned plungers, and B. comprising first and second low friction bushings slidably fitting around said first and second plungers, respectively.

13. Pedalling apparatus according to claim 7, having the further improvement comprising A. mounting means for adjustably mounting said latch means to said pedal with selected positioning of said latch axis relative to said pedal axis, and B. scale means for indicating the position of said latch axis relative to said pedal axis.

14. Pedalling apparatus according to claim 7, wherein said socket means includes attachment means for mountingly attaching said socket means to a shoe with said latch-receiving recess facing downwardly from the shoe sole.

15. Pedalling apparatus according to claim 14 wherein said attachment means includes adjustable strap means adapted to wrapping about a forefoot portion of the shoe.

16. Pedaling apparatus according to claim 7, wherein said socket means further includes debris-discharging port means communicating between said recess and the outside of said socket means.

17. Pedalling apparatus according to claim 7, wherein said pedal further includes means providing a low-friction pedal upper surface adapted to receive pedalling load of a rider's foot.

18. Pedalling apparatus according to claim 7 having the further improvement wherein each of said latch means and said seating means has a surface normally extending vertically and longitudinal with the pedal axis, for respective engagement during pedalling strokes directed forwardly for said transmittal of cycling thrust.

19. In pedalling apparatus for releasably and replaceably coupling a rider's foot to a pedal arranged to revolve about a pedal axis and having latch means upwardly projecting on the pedal with first and second latch members selectively-directed along a latch axis longitudinal with said pedal axis and wherein at least one said latch member is deflectable and resiliently biased relative to the other along said latch axis, the improvement comprising A. socket means arranged for wearing on the underside of a rider's foot and having a downwardly-facing recess arranged for receiving therein the latch means, B. said recess having latch seats consisting of one pair of first and second opposed latch seats spaced apart along the pedal axis, C. said socket recess further having guide means forward of said latch seats, and being arranged for releasably and replaceably couplingly seating the latch means with said latch seats releasably and replaceably seating, against the action of said resilient bias, latch members of said latch means seated in said recess, D. said socket recess and said latch seats being adapted to effect said seating with the latch means with selected relative movement of said socket means, said selected relative movement including at least vertical longitudinal, and twist movement, E. whereby said socket means resist unseating of the latch means coupled therewith and transmits thereto a cycling thrust in response to pedalling movement of a rider's foot, and releases from the latch means in response to selected non-pedalling movement.

20. In pedalling apparatus according to claim 19, the further improvement wherein A. said socket means includes a shoe having a sole having a walking surface free of pedal-engaging projections and forming said latch-receiving recess.

21. In pedalling apparatus according to claim 20, the further improvement comprising manually-adjustable securing means for securing said sole to the upper portion of said shoe.

22. In pedalling apparatus according to claim 21, the further improvement wherein said securing means includes adjustable strap means adapted for wrapping about a forefoot portion of said shoe.

23. In pedalling apparatus according to claim 20, the further improvement wherein said sole comprises a flexible walking surface portion and a substantially rigid portion defining at least part of said socket recess and forming said latch seats.

24. In pedalling apparatus according to claim 19, the further improvement wherein said latch-receiving recess of said socket means includes first and second opposing side walls which receive and seat between them the latch means, said side walls being diposed at a selected angular offset from vertical and relative to said latch axis for controlling said latch member-coupling.

25. In pedalling apparatus according to claim 24, the further improvement wherein said side walls are tilted in a vertical direction for controlling said release of latch member in response to vertical pulling of the rider's foot.

26. In pedalling apparatus according to claim 24, the further improvement wherein said side walls are tilted in a longitudinal direction for controlling said release of latch-members in response to twisting of the rider's foot.

27. In pedalling apparatus for releasably and replaceably coupling a rider's foot to a pedal arranged to revolve about a pedal axis and having socket means arranged for wearing on the rider's foot, the socket means having a recess with first and second latch seats, the improvement comprising A. latch means upwardly projecting on said pedal with one pair of first and second opposed and relatively-deflectable latch members selectively directed along a latch axis longitudinal with said pedal axis, B. means for resiliently biasing said relative deflection of said latch members along said latch axis, C. said latch means being removably receivable in the socket recess, with said latch members removably seated in the latch seats and with said resilient bias urging said members into the seats, for releasably coupling said latch means with the socket means, D. said latch means being adapted to effect said releasable and replaceable coupling, against the action of said biased deflection, with the socket means with selected movement of said latch means relative to the socket means, said selected relative movement including at least any of vertical movement, longitudinal movement and twist movement, E. whereby said latch means resists unseating from the socket means and receives therefrom a cycling thrust in response to pedalling movement of a rider's foot, and unseats from the socket means in response to selected non-pedalling movement.

28. In pedalling apparatus according to claim 27, the further improvement wherein said latch members comprise first and second projections aligned and resiliently deflectable along said latch axis.

29. In pedalling apparatus according to claim 27, the further improvement wherein said latch means includes means for adjusting the resilient bias of said latch members.

30. In pedalling apparatus according to claim 27, the further improvement comprising latch-positioning means for providing a selected rotational adjustment of said latch axis relative to said pedal axis.

* * * * *